United States Patent [19]

Wu et al.

[11] Patent Number: 4,797,323

[45] Date of Patent: Jan. 10, 1989

[54] FLAME RETARDANT WIRE WITH HIGH INSULATION RESISTANCE

[75] Inventors: Alexander F. Wu, Bridgeport, Conn.; Robert B. Walters, Morrison, Colo.

[73] Assignee: Vulkor, Incorporated, Lowell, Mass.

[21] Appl. No.: 703,057

[22] Filed: Feb. 19, 1985

Related U.S. Application Data

[60] Division of Ser. No. 578,729, Feb. 9, 1984, abandoned, which is a continuation of Ser. No. 315,339, Oct. 26, 1981, abandoned.

[51] Int. Cl.⁴ .......................................... B32B 15/04
[52] U.S. Cl. .................................... 428/389; 428/372; 428/375; 428/390; 428/391; 174/110 SR; 174/110 PM
[58] Field of Search ............... 428/375, 379, 389, 372, 428/391, 390; 174/110 SR, 110 PM

[56] References Cited

U.S. PATENT DOCUMENTS

| | | | |
|---|---|---|---|
| 3,635,862 | 1/1972 | Dunn | 524/94 |
| 4,123,586 | 10/1978 | Betts et al. | 428/391 |
| 4,209,566 | 6/1980 | Betts et al. | 428/389 |
| 4,260,661 | 4/1981 | Walters et al. | 428/389 |

Primary Examiner—Sharon A. Gibson
Attorney, Agent, or Firm—Hedman, Gibson, Costigan & Hoare

[57] ABSTRACT

Very high levels of insulation resistance and of insulation resistance stability of insulating compositions having polyolefin bases and having polar organic additives are achieved in this invention. The polar organic additives can be organic halogenated flame retardants, such as decabromodiphenyl oxide. The surprising increase in insulation resistance and in insulation resistance stability is achieved by addition of certain antioxidants in combination and, particularly, the addition of a zinc salt of mercaptoimidazole and a sterically hindered ditertiary butyl phenol. The composition may be crosslinked by radiation or even by chemical means as through use or organic peroxides without loss of the surprisingly increased insulation resistance and insulation resistance stability.

26 Claims, 3 Drawing Sheets

FLAME RETARDANT WIRE WITH HIGH INSULATION RESISTANCE

CROSS-REFERENCE TO RELATED APPLICATIONS

This is a division of copending application Ser. No. 578,729, filed Feb. 9, 1984, now abandoned, which in turn is a continuation of application Ser. No. 315,339, filed Oct. 26, 1981, now abandoned.

BACKGROUND OF THE INVENTION

The present invention relates to compositions which have improved insulation resistance stability and to methods of preparation thereof. More specifically, the invention relates to compositions which have improved insulation resistance stability in water so that compositions can be employed in forming insulation layers which are thinner by a substantial amount than previous insulations and yet provide adequate or improved degrees of insulation resistance stability.

A number of compositions are known which have relatively high insulation resistance stability. Among such compositions are the crosslinked polyethylene compositions prepared generally according to the teachings of the Gilbert and Procopio U.S. Pat. Nos. 2,888,442 and 3,079,370 assigned to the same assignee as the subject application.

It is known that particular properties, such as flame retardancy, electrical properties and moisture resistivities, etc., are of great significance during the actual course of application of polymeric materials in the field. A number of compositions are known which have relatively high flame retardancy properties. Among such compositions are the ones which employ highly effective commercial halogenated flame retardant additives. However, the utilization of halogenated flame retardants in the polymeric materials introduces a high level of polarity into the polymeric materials. The introduction of highly polarized material into the insulating polymeric compositions has long been known to have severely detrimental effects upon the electrical properties, such as insulation resistances and dielectric strength. Such detrimental effects have been accentuated where the polymer compositions containing highly polarized material has been used in wet locations. This is because the presence of the highly polarized ingredient in a polymeric composition has effectively induced absorbtion of moisture. Accordingly, the presence of a highly polarized ingredient in an insulating polymeric composition has precluded long term use of such insulating composition in moist or wet environments. Improvements in the insulation resistivity and resistance to moist environment have been made over a period of time for halogenated compositions. Among such compositions are the ones prepared generally according to the teachings of the Betts and Holub U.S. Pat. No. 4,209,566 assigned to the same assignee as the subject application.

Although such compositions are highly satisfactory and represent an advance in the art, as the needs of the industry change with time, there comes times when still further improvements in the insulation resistance stability of such insulating compositions are desired and needed.

Recently, in particular, there has been a need for providing wire and cable with a reduced volume of insulation as the cost of the polymer ingredients have greatly increased. Also, as equipment in which wire has been employed has grown smaller, the need for reducing the wire volume in such equipment has increased.

For example, in a control cable, if a wire insulation thickness is reduced from 30 mils to 20 mils, then the wire diameter is actually reduced by 20 mils due to the 10 mil reduction on each insulating sidewall of the wire. Where a number of such wires are grouped in a control cable, the 20 mil diameter reductions are added for each wire across one diameter of the cable. For example, where seven wires are bundled in a control cable there are essentially three wires across one diameter of the cable, one wire at the center and six wires grouped about the single center wire. For such as cable, the reduction in diameter is about 60 mils for the diameter of the wire bundle. In addition, an outer jacket will have a smaller diameter because of the smaller diameter bundle which it contains.

OBJECTS OF THE INVENTION

One object of the present invention is to provide novel insulation compositions which make possible reduction in the thickness of a deposited layer of insulation without loss of important electrical properties such as the insulation resistance stability.

Another object is to provide a method of forming such novel wire and cable products insulated therewith.

Still another object of the invention is to provide wire insulated with compositions which have improved insulation resistance stability.

Another object is to provide insulated wires which have relatively thinner layers of insulation but which have properties which are equal to or superior to insulation layers of thicker dimensions.

Another object of this invention is to provide methods for forming such insulated articles.

Another object is to provide a composition particularly suitable for use in insulating cables to be employed in damp and wet locations, including wet locations which are at elevated temperatures.

Another object is to provide a composition as in the prior object for insulating power cables for use in wet locations including use at elevated temperature in wet locations.

Another object is to improve the insulation resistance stability of compositions which contain highly polar organic flame retardants.

Another object is to provide compositions having improved insulation resistance stability.

Another object is to provide articles insulated with compositions having improved insulation resistance stability.

Another object is to provide crosslinkable compositions having improved insulation resistance stability.

Other objects will be in part apparent and in part pointed out hereinafter.

BRIEF STATEMENT OF THE INVENTION

Objects of the present invention are achieved by combining polyolefin base polymer with polar organic additives and by including in the composition antioxidants which cause surprising increase in the insulation resistance and in the insulation resistance stability of the resultant composition. The polar organic additives may be organic halogenated flame retardants such as decabromodiphenyl oxide and the antioxidants may be a zinc salt of a mercaptoimidazole and a sterically hindered ditertiary butyl phenol.

The composition may contain other conventional additives.

The composition may also be crosslinked and such crosslinking may be by high energy radiation such as high energy electrons or be by conventional chemical crosslinking agents such as organic peroxides.

DESCRIPTION OF A PREFERRED EMBODIMENT

Figure 1:
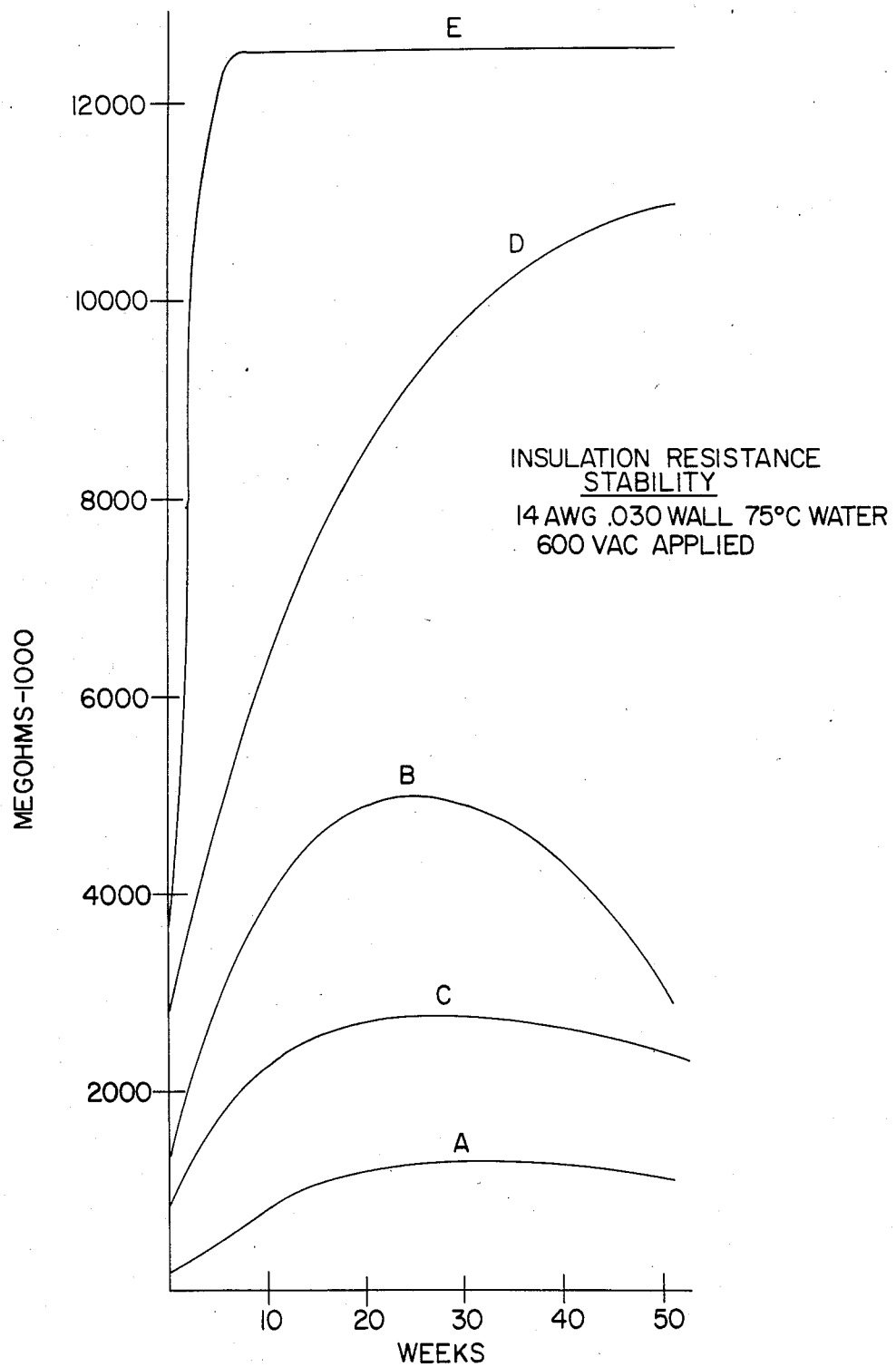
FIG. 1 is a graph of the test data obtained from measurement of the insulation resistance of a number of compositions measured in megaohms against time indicated as the abcissa in weeks.

As indicated above, a novel feature of the present invention is a composition which contains a highly polar additive but which also has a high insulation resistance as well as a high insulation resistance stability.

The composition itself has a polyolefin base polymer composition and other ingredients are combined with the polyolefin base as set out below.

A first ingredient is an organic flame retardant which has been the subject of a special treatment preparation procedure.

A treated flame retardant used and useful in practice of the present invention is a pretreated composition described in essential details in the U.S. Pat. No. 4,209,566 assigned to the same assignee as the subject application, which patent is hereby incorporated herein by reference. Such flame retardant includes both a set of ingredients and a treatment of the ingredients including an ovenizing treatment. The set of ingredients, as well as their proportions, are set forth in Table I below.

A first ingredient of the pretreated composition is an organic halogenated flame retardant. The organic halogenated flame retardant may preferably be the decabromodiphenyl oxide or decabromodiphenyl ether, but may also be ethylene bis (tetrabromophthalimide) sold commercially under the designation BT-93 by Saytech Corporation, or a brominated diphenyl oxide of a lower degree of bromination. In a more general sense, the stable organic halogenated flame retardant may be employed, such as the chlorinated flame retardant available commercially under the trade name Dechlorane of Hooker Chemical Corporation.

The treated flame retardant also contains antimony oxide. The antimony oxide flame retardant used in the treated flames retardant of the present invention is the conventional or standard powdered compound.

The treated flame retardant used and useful in the present invention also includes a fumed silica ingredient. One such fumed silica found useful in preparation of a suitable treated flame retardant is one sold commercially under the designation Cabosil MS7 and available from C.L Cabot Inc. of Boston, Mass.

The treated flame retardant useful in the present invention also includes a silicone fluid ingredient, which is a reactive silicone such as is described in the U.S. Pat. No. 4,209,566 assigned to the same assignee as the subject application.

Lastly, the treated flame retardant useful in the present invention is prepared by a heat treatment procedure which may typically be a baking of the well-mixed ingredients described above at a temperature of about 375° F. for a period of 16 hours. Such treatment and variations thereof are more fully described in the issued U.S. Pat. No. 4,209,566 referred to above and incorporated herein by reference.

The foregoing is a description of each of the ingredients of Table I and the Table also sets forth the proportions in which the ingredients may be used as well as proportions in which they are preferably used.

TABLE I

| INGREDIENTS | USEFUL RANGE | PREFERRED RANGE |
| --- | --- | --- |
| Decabromodiphenyl oxide | 100 | 100 |
| Antimony oxide | 10–70 | 20–50 |
| Fumed silica | 5–30 | 10–20 |
| Reactive silicone fluid (as described in U.S. Pat. No. 4,209,566) | 0.1–10 | 3–5 |

The Table I above sets forth the ingredients and makeup of a special flame retardant additive useful in combination with polyethylene and other ingredients in carrying out the present invention.

Consideration is given next to the other ingredients of the novel compositions of this invention.

Considering first the ingredients as listed in Table II, the polyolefin as used herein refers to polyethylene as a preferred component, but the polyolefin may also be copolymers of ethylene, including but not limited to ethylene ethyl acrylate, ethylene vinyl acetate copolymers, ethylene-butene copolymers, ethylene-propylene copolymers, terpolymers and quatrepolymers such as EPDM. Also, the polyolefin may be either of the high density or the low density polyethylene or may be polyallomer.

Dibasic lead phthalate composition or ingredient may be used in the composition of this invention and may be any organic lead compound in which the lead proportion is roughly equivalent to that of the dibasic lead phthalate or greater. For example, other organic lead compounds which have low volatility and which result in suitable stabilization properties may be employed but the dibasic lead phthalate is the preferred compound for this ingredient. By stabilization is meant that the lead compound can scavenge free halogen from the composition.

Silicone gum can be used as an optional ingredient and is accordingly included as such in Table II below, as is the dibasic lead phthalate. The silicone gum useful in the novel composition of this invention is described in copending application Ser. No. 196,989 filed Oct. 14, 1980 which has been abandoned and assigned to the same assignee as the present application. The application Ser. No. 196,989 is incorporated herein by reference as is copending application filed July 21, 1981. Ser. No. 737,357, filed July 22, 1985 which is a division of Ser. No. 516,609 filed July 25, 1983, which is now abandoned, which is a continuation of Ser. No. 285,655 filed July 21, 1981, which is now abandoned. The benefits pointed out in the copending application will be obtained in reference to the composition of the present invention.

The peroxide curing agent as indicated may be an organic peroxide which decomposes, i.e. generates free radicals, at the elevated temperatures above the basic mixing temperatures and may be, as in the examples given, dicumyl peroxide. Alternatively, materials sold under the commercial designation Vul-Cup R may be employed although the cost is higher than that of the dicumyl peroxide. Such organic peroxides are known in the art and in the present literature directed to this art and are described in part in the patents referenced above which patents are incorporated herein by reference.

The bromine containing treated flame retardant is as described above.

Other additives conventionally used in polyolefin base polymer composition used in wire insulation may also be added and included. For example, conventional fillers, pigments, curing coagents, and other conventional additives including preservatives such as modifying agents, mold release ingredients, processing aids or lubricants and the like and commonly employed with polyolefins in addition to the essential ingredients set forth above and hereinafter such as the pre-processed flame retardant and the special combination of antioxidants, may be used.

The octamethyltetracyclosiloxane ingredient is a reactive silicone fluid which is commercially available from General Electric Company at Waterford, N.Y., under the trade designation SC-3636 and is an optional ingredient in the compositions of the subject application.

The ingredients of Table I are used as a single pretreated ingredient in the combination of ingredients as set out in Table II below.

TABLE II

| INGREDIENTS | USEFUL RANGE | PREFERRED RANGE |
|---|---|---|
| Polyolefin | 100 | 100 |
| Bromine containing treated flame retardant* | 5–80 | 10–70 |
| Dibasic lead phthalate | 0–20 | 1–10 |
| Silicone gum | 0–20 | 1–10 |
| Lead stearate | 0–3 | 0–2 |
| Octamethyltetracyclosiloxane | 0–5 | 0–3 |
| Triallyl cyanurate | 0–5 | 0–3 |
| Organic peroxide | 0–8 | 1–5 |
| Zinc salt of a mercaptoimidazole** | 0.5–15 | 1–10 |
| Sterically hindered di-tertiaty butyl phenol*** | 0.5–15 | 1–10 |

*An ovenized blend as described above of decabromodiphenyl oxide, fumed silica and silicone fluid and as set forth in U.S. Pat. No. 4,209,566 incorporated herein by reference.
**As set forth in U.S. Pat. No. 4,260,661 and commercially available under the designation Vulkanox ZMB-2.
***As set forth in U.S. Pat. No. 4,260,661 and commercially available under the designation Irganox. An example of an Irganox is Irganox 1010 or Irganox 1035.

The results obtained from practice of the present invention are given with reference to Example 1 and FIG. 1.

Where higher temperature insulating compositions are desired or, in other words, where it is desired to employ an insulating composition at a higher use temperature, generally a larger amount of the antioxidant components listed in Table II should be employed in the combination of Table II for a higher projected use temperature.

To illustrate, if a use temperature of 125° C. is sought, then the ratio or proportion of the ZMB-2 ingredient and also the proportion of Irganox ingredient substantially as set forth in lower ranges of values should be employed. For still higher temperatures of use of the insulating compound prepared pursuant to this invention, employing the antioxidant ingredients of U.S. Pat. No. 4,260,661 at temperatures at and above the order of 150° C. or above, some still higher concentration ranges set forth for the ZMB And the Irganox antioxidants will permit such higher use temperatures to be achieved.

The peroxide ingredient of the composition may be omitted and high energy radiation, such as high energy electrons, can be employed to cause crosslinking and curing of the coating composition also by methods well known in the art.

Figure 2:
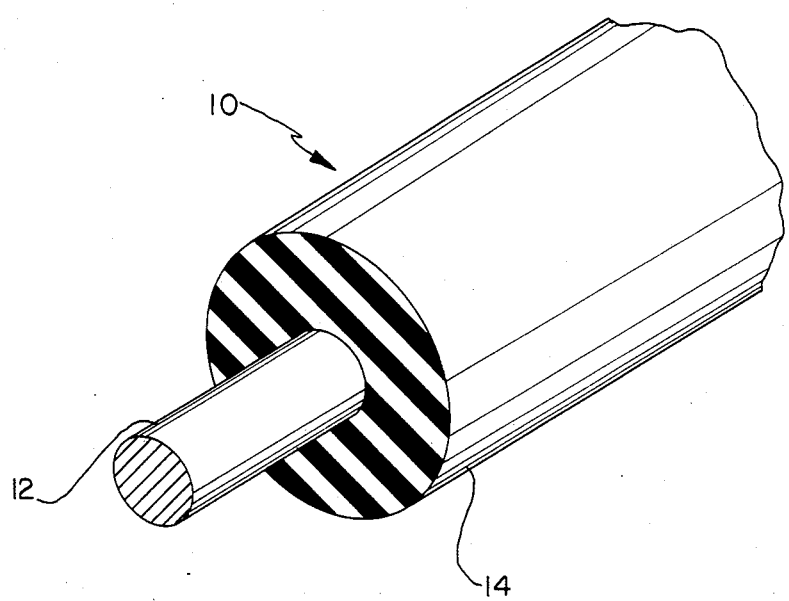
FIG. 2 is a perspective view of a wire formed pursuant to the present invention having a central conductor and an insulating layer about the conductor.

In FIG. 2, there is illustrated a central conductor 12 about which has been formed an insulating layer 14 prepared pursuant to the present invention. The insulating layer 14 may be in the curable state or may be in the cured state. Also, the cured insulation may be chemically cured or cured by high energy radiation. The product illustrated is an insulated conductor 10, the conductor of which may be solid as illustrated or stranded.

Figure 3:
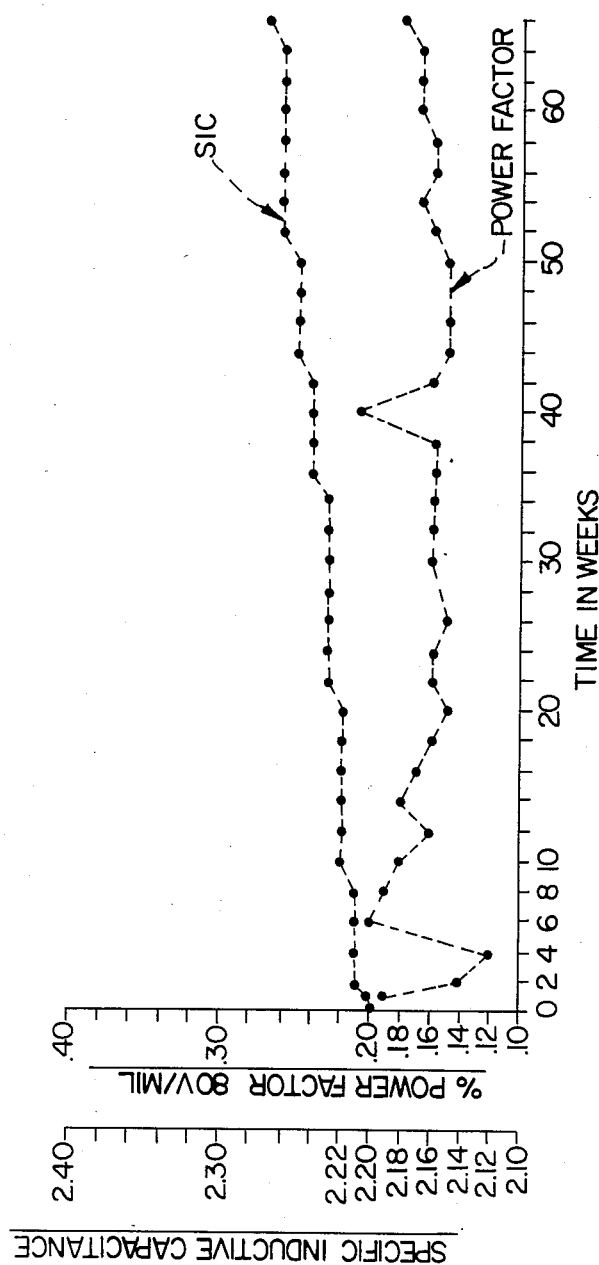
FIG. 3 is a graph of the specific inductive capacitance and the percent power factor against time in weeks.

Referring now to FIG. 3, a set of data resulting from tests performed on the composition of a sample E of Table III was obtained and the test results are plotted in the Figure. The abscissa of the plot is time in weeks and it is evident that the tests extended over a period of about 66 weeks.

Two ordinates are shown. The first is the SIC, or specific inductive capacitance, and the second is the percent power factor at 80 volts per mil. The scales for the two sets of tests are different so that although the graphs are plotted relatively close to each other, they actually correspond to different values which are values used for the respective ordinates of the graph. As is evident from the graphs, the samples were tested at intervals represented by the dots and, prior to each such test, the wire sample being tested was subjected to a so-called "high pot" test which involved the imposition of a high voltage, of 2.4 kilovolts, to the conductor of the wire as the insulated portion of the wire was immersed in a water bath at a temperature of 75° C. The 2400 volt potential existed between the conductor of the insulated wire immersed in the water and an uninsulated copper wire which was also immersed in the water.

From the results which are plotted in FIG. 3, it is evident that the specific inductive capacitance of the insulation composition of the subject invention gives a very stable performance with regard to the insulating composition which insulates the wire and that there is a relatively small change in specific inductive capacitance over the entire period of 66 weeks during which the measurements were made. This is in addition to the fact that the actual specific inductive capacitance overall value was itself uniquely low for the composition corresponding to Test E of Table III.

Considering next the actual graph data for the percentile factor, at the 80 volt per mil potential, here again the graph data demonstrates that the power factor was quite remarkably low for a flame retardant composition and, in addition, that the power factor remained very stable and showed essentially no increase overall during the entire 66-week period of the test.

Based on the foregoing, it is evident that the composition of the present invention is unique in providing both flame retardancy in combination with a unique set of electrical properties of remarkable stability for an insulating material which contains the type of flame retardant which is present in the subject material.

EXAMPLE 1

In Example 1, a single set of the first set of ingredients, including all ingredients other than antioxidants, was chosen and the quantities of these ingredients was constant for all tests performed including Tests A, B, C, D and E. The antioxidant and the antioxidant content were varied. The changes in antioxidant ingredients and amounts were the only changes made in the compositions A through E. The remarkable differences in results obtained, particularly differences in insulation resistance stability for the relatively minor changes in antioxidant content, are set forth in graphical form in FIG. 1, where individual plots are labelled A through E. These results attest to the uniqueness and novelty of the compositions and articles of the present invention.

the resultant novel composition. To be more explicit about the nature and extent of the novel results discovered in connection with the subject composition, a more detailed description of the results obtained is given here.

Referring now to FIG. 1, the data obtained from tests of the compositions as set forth in Table III is plotted with the insulation resistance in megaohms displayed on the ordinate scale and the time in weeks on the abscissa scale. The individual curves of plotted data correspond to the individual compositions which are set out in Table III. In Table III, the test composition labelled A through E are marked with the letters used at the head of the column for the data recorded for the compositions employed. It will be understood that each composition was the same in its constituents and in the proportions of the constituents, other than the antioxidants.

TABLE III

| INGREDIENTS | PARTS BY WEIGHT | TEST A | TEST B | TEST C | TEST D | TEST E |
|---|---|---|---|---|---|---|
| Polyolefin | 100 | 100 | 100 | 100 | 100 | 100 |
| Bromine containing treated flame retardant | 10–70 | same | same | same | same | same |
| Dibasic lead phthalate | 1–10 | same | same | same | same | same |
| Silicone gum | 1–10 | same | same | same | same | same |
| Lead stearate | 0–2 | same | same | same | same | same |
| Octamethyltetracyclosiloxane | 0–3 | same | same | same | same | same |
| Triallyl cyanurate | 0–3 | same | same | same | same | same |
| Organic peroxide | 1–5 | same | same | same | same | same |
| Zinc salt of a mercaptoimidazole Sterically hindered di-tertiary butyl phenol: | | | | 1.5 | 1.5 | 1.5 (ZMB-2) |
| Irganox 1035 | | | | | 1.5 | |
| Irganox 1010 | | | | | | 1.5 |
| Agerite MA | | 1.5 | 3 | 1.5 | | |
| Santowhite Crystals | | 0.25 | .5 | | | |

Tests of insulation resistance and of insulation resistance stability were performed on each of the five composition, A through E, listed in Table III above. The results of the tests which were performed are plotted in the graphs A through E in FIG. 1 of the drawings. In this figure, time in weeks is plotted as the abscissa and the resistance in megaohms measured between the conductor in the wire and the water for 1000 feet of wire in water at 75° C. is plotted as the ordinate.

From the plot of the data in FIG. 1, it is evident that an unusual and completely unexpected improvement in the insulation resistance and in the insulation resistance stability has been discovered. The improvement is shown in the graphs for the test compositions D and E of the Example 1, Table III. The plots of Tests D and E are compared to the graphs for Tests A, B and C which have the compositions as listed in Example 1, Table III. All compositions had all ingredients other than the antioxidant ingredients within the range indicated under "Parts by Weight" and in precisely the same proportions and amounts for each of the test samples A through E as indicated by the designation "same". The significant difference in ingredient content involved only the use of different antioxidants and combinations of antioxidants, and particularly, the combination of the Vulkanox ZMB and one of the Irganox antioxidants. It is evident that a very dramatic improvement in insulation resistance and insulation resistance stability is demonstrated by Test plots A, B, C, D and E of FIG. 1.

It should be emphasized that the remarkable gain in insulation resistance stability is the result of providing a certain and unique combination of antioxidants in the composition and not by inclusion of any ingredient which might be expected to improve the insulation resistance or the stability of the insulation resistance of Specifically, the conventional Agerite and Santowhite antioxidants as well as the zinc salt of a mercaptoimidazole and the sterically hindered di-tertiary butyl phenol, were changed as indicated but none of the proportions or concentrations of the other ingredients varied from the composition for Graph A through the composition for Graph E. However, there was variation in the concentration proportions of the special antioxidants which were employed and these are set forth in Table III.

The UL test used in obtaining the test data is UL Test 83 for Thermoplastic Insulated Wires and Cables, and UL Test 44 for Rubber Insulated Wires and Cables.

Turning now to FIG. 1, the insulation resistance stability for a wire formed with a 14 AWG internal conductor and a 30 mil wall thickness and tested at 75° C. in water with 600 volts AC applied are given. The first curve A shows that the insulation resistance rose from a low value to a maximum of approximately 1300 in a period of 30 to 35 weeks and that thereafter the insulation resistance declined with the passage of time.

Turning next to the plot for Graph B, the curve is so marked on the drawing and it is evident that in a period of about 25 weeks, the curve reached a maximum value of about 5000 megaohms and that thereafter there was a fairly rapid decline in the value of the insulation resistance measured. It will be noted that the composition for which Graph A was plotted contained neither of the special antioxidants, but did contain a conventional combination of antioxidants, namely, the Agerite MA and Santowhite Crystals, in the ratio of 1.5 for Agerite MA and 0.25 for the Santowhite Crystals, and that in Graph B the value of the Agerite MA and Santowhite Crystals was doubled from the values in Graph A. A significant increase in the insulation resistance occured but there was also a very rapid decline in the insulation resistance.

Considering next the Graph C, it is evident that 1.5 parts of Agerite MA were combined with 1.5 parts of the ZMB-2, or the zinc salt of a mercaptoimidazole. Here the increase in the insulation resistance was pronounced for the first 20 weeks after which the curve essentially leveled off at a value of about 2700 megaohms and after that it declined gradually with further passage of time.

Considering next the Graph D, and the constituents of the composition, it is evident that this composition contained a combination of the zinc salt of a mercaptoimidazole to the extent of 1.5 parts, and also contained 1.5 parts of the sterically hindered di-tertiary butyl phenol, sold commercially under the designation Irganox 1035. It is evident that this curve rose more rapidly than in any of the others and to a much higher value than any of the others, rising to a value of about 11,000 megaohms in a period of one year, or about 52 weeks. This is a unique and remarkable change in the insulation resistance and in the stability of the insulation resistance inasmuch as there is no decline in the insulating resistance after a period of one year although there was a very rapid increase in the insulation resistance during approximately the entire year. Accordingly, it is evident from this test that a comparison of the graphed results obtained for materials using the more conventional antioxidants, and not using the combination of antioxidants employed in the present invention, that the insulation resistance and the insulation resistance stability are of a relatively low order for compositions with such conventional antioxidants although one would recognize that the insulation resistance values which were achieved for compositions of tests A, B and C were higher than the values achieved by flame resistant compositions containing organic halogen flame retardants previously known. Nevertheless, a very striking and unique improvement in the insulation resistance and insulation resistance stability is found by the use of the combination of the relatively small proportions of the two special antioxidants in combination and, specifically, the ZMB-2 and the Irganox 1035.

Considering next the tabulation of data for Graph E in Table III, it is evident that the only difference from the tabulation of data for Test D, Graph D is that the Irganoz 1010 was used in place of the Irganox 1035 and it was a simple substitution in that the same quantity of the Irganox 1010 was employed as had been employed in Test D, Graph D where Irganox 1035 was used. Please note from the graph the totally remarkable plot of data which was obtained from this experiment and that the insulation resistance rose very rapidly and within a period of approximately 8 weeks, to a value of 12,500 megaohms and that it remained essentially constant for the remainder of the first full year.

There is no explanation by which the difference in the insulation resistance property or in the stability of the insulation resistance property can be distinguished from that found for the combination of Irganox 1035 and ZMB-2 as shown in Graph D, but it is obvious from the plot of data that Graph E is a most remarkable and unique result to have been found for an insulation resistance and stability of insulation resistance for the composition as set forth in Table III.

EXAMPLE 2

A comparison was also made between a wire prepared with a 30 mil wall having a composition corresponding to test composition A of Table III and a wire with a 20 mil wall prepared with a composition of the test compound E of Table III. The data compiled in making this comparison is given in Table IV immediately below.

TABLE IV

|  |  | 30 mil wall | 20 mil wall |
|---|---|---|---|
| MECHANICAL MOISTURE ABSORPTION | | | |
| 7 days at 70° C., in mg/in$^2$ | | 1.51 | 0.93 |
| EM-60 - UL and ICEA standard test: | | | |
| 1 day: | % Power Factor at 80 v/mil | 0.36 | 0.38 |
|  | Specific Inductive Capacitance (SIC) | 2.20 | 2.05 |
|  | Stability Factor |  | 0.02 |
| 7 days: | % Power Factor at 80 v/mil | 0.28 | 0.30 |
|  | SIC | 2.20 | 2.06 |
| 14 days: | % Power Factor at 80 v/mil | 0.26 | 0.26 |
|  | SIC | 2.20 | 2.06 |
|  | Stability Factor | 0.02 | 0.02 |
| % SIC Increase: | | | |
| 1-14 days | | 0.00 | 0.49 |
| 7-14 days | | 0.00 | 0.00 |
| FLAME RETARDANCE | | | |
| VW-1 | | pass | pass |
| UL-94 Vertical Flame | | pass | pass |
| Toluene Extraction; % | | 25.2 | 25.0 |
| IEEE 383 and 323 Qualification* | | pass | pass |
| Original Tensile, psi | | 1995 | 2071 |
| Original Elongation, % | | 329 | 333 |
| HEAT AGING CHARACTERISTICS | | | |
| at 158° C. air oven | | | |
| 7 days: | % RT** | 87 | 92 |
|  | % RE*** | 94 | 97 |
| 14 days: | % RT | 86 | 88 |
|  | % RE | 86 | 88 |
| 21 days: | % RT | 56 | 50 |
|  | % RE | 9 | 7 |
| at 136° C. air oven | | | |
| (UL requirement for 125° C. rating) | | | |
| 30 days: | % RT | 100 | 89 |
|  | % RE | 92 | 90 |
| 60 days: | % RT | 93 | 84 |
|  | % RE | 88 | 84 |
| 4 hours at 70° C. - #2 ASTM oil | | | |
| % RT | | 108 | 97 |
| % RE | | 99 | 97 |
| 4 hours - air bomb | | | |
| % RT | | 92 | 86 |
| % RE | | 94 | 99 |
| LOCA | | pass | pass |

*Heat aged to simulate 40-year thermal life, then received 220 megarads of gamma radiation prior to a 33-day LOCA cycle and subsequently a Hipot to 2.4 kilovolts per minute.
**% RT is the percent of the original tensile retained after heating for the indicated period.
***% RE is the percent of the original elongation retained after the indicated heating.

From the content of Table IV, it is evident that the original tensile of the 30 mil sample is approximately the same as that of the 20 mil sample. In addition, the elongation of the 30 mil sample is approximately equivalent to that of the 20 mil sample.

Further, with regard to heat aging characteristics, the heating at 158° C. in an air oven gave results which are very comparable and demonstrate that the 20 mil wall thickness of a wire product prepared with an insulation coating of the composition E gives results which are the equivalent of the 30 mil sample of composition A.

Further, with regard to the air oven heating at 136° C., here again the results achieved show that the heat aging characteristics for the 30 mil sample are about equivalent to those of the 20 mil sample.

With further regard to the 4-hour heating at 70° C. in #2 ASTM oil, the results obtained here again demonstrate a substantial equivalency in performance of the 30 mil sample as compared to the 20 mil sample.

With further regard to the 4-hour heating of the samples in an air bomb, again a substantial equivalency is demonstrated between the two samples.

With regard to the mechanical moisture absorption for 7 days at 70° C., the 30 mil sample absorbed more than 50% more than the 20 mil sample.

A series of tests known as the EM-60 tests were performed on the two wire samples and as is evident in Table IV, the results obtained are substantially the same for the 30 mil sample and for the 20 mil sample.

Concerning the percent of specific inductive capacitance increase, the 20 mil sample showed a greater increase in the SIC measurement in the 1 to 14 day test, but as a practical matter, the difference is not significant in actual application of the wire products. In the 7 to 14 day period, there was no increase by either the 30 or 20 mil sample.

Very significantly, both samples passed the UL-94 vertical flame test. In addition, both samples passed the VW-1 test, the most difficult flame test procedure used in the wire and cable field. The toluene extraction percent for each of the two samples is essentially the same. Both samples passed the IEEE 383 and 323 qualification test. All of the foregoing tests are standard tests and descriptions thereof can be obtained from standard references and from other patents which deal with essentially the same subject matter as the subject application.

The particular sample of wire which was used in each of the tests was a #12/19 tinned stranded conductor. In other words, the wire had nineteen tinned strands.

Since numerous embodiments can be made of the invention as described in the foregoing application, it should be realized that the foregoing is given as illustrative of the invention and is not to be interpreted as limiting except to the extent set forth in the attached claims.

We claim:

1. A cable coated with a crosslinkable composition having suitable properties for an insulation material, which comprises a polyolefin, a reactive silicone fluid from 5 to 80 parts by weight of a bromine-containing flame retardant agent, from 0.5 to 15 parts by weight of a zinc salt of mercaptoimidazole, and from 0.5 to 15 parts by weight of a sterically hindered di-tertiary butyl phenol, these amounts being for each 100 parts by weight of the polyolefin.

2. A cable insulated with the crosslinked composition of claim 1.

3. The cable of claim 2, in which the crosslinked cable coating composition has been peroxide crosslinked.

4. A cable insulated with the crosslinked composition of claim 1 to a thickness of about 20 mils.

5. The cable of claim 4, in which the crosslinked cable coating composition has been peroxide crosslinked.

6. A cable coated with the composition of claim 1, in which the bromine-containing flame retardant agent comprises 100 parts by weight of decabromodiphenyl oxide, from 10 to 70 parts by weight of antimony oxide, from 5 to 30 parts by weight of fumed silica, and from 0.1 to 10 parts by weight a reactive silicone fluid.

7. A cable insulated with the crosslinked composition of claim 6.

8. A cable insulated with the crosslinked composition of claim 6 to a thickness of about 20 mils.

9. A cable insulated with the composition of claim 6, in which the composition also contains 1 to 5 parts by weight of organic peroxide.

10. A cable insulated with the composition of claim 9 to a thickness of 20 mils.

11. The cable of claim 1, in which 0 to 8 parts by weight of organic peroxide have been blended into the cable coating composition.

12. A cable according to claim 13, in which the composition of the coating includes up to 20 parts by weight of dibasic lead phthalate, up to 20 parts by weight of silicone gum, up to 3 parts by weight of lead stearate, up to 5 parts by weight of octamethyltetracyclosiloxane, and up to 5 parts by weight of trialkyl cyanurate.

13. A cable coated with a crosslinkable composition having suitable properties as an insulation material, which comprises a polyolefin, a reactive silicone fluid, from 10 to 70 parts by weight of a bromine-containing flame retardant agent, from 1 to 10 parts by weight of dibasic lead phthalate, from 1 to 10 parts by weight of silicone gum, from 1 to 10 parts by weight of a zinc salt of a mercaptiomidazole, and from 1 to 10 parts by weight of a sterically hindered di-tertiary butyl phenol, these amounts being for each 100 parts by weight of the polyolefin.

14. A cable insulated with the crosslinked composition of claim 13.

15. The cable of claim 14, in which the crosslinked cable coating composition has been peroxide crosslinked.

16. A cable insulated with the crosslinked composition of claim 13 to a thickness of 20 mils.

17. The cable of claim 16, in which the crosslinked cable coating composition has been peroxide crosslinked.

18. A cable coated with the composition of claim 13, in which the bromine-containing flame retardant agent comprises 100 parts by weight of decabromodiphenyl oxide, from 20 to 50 parts by weight of antimony oxide, from 10 to 20 parts by weight of fumed silica, and from 3 to 5 parts by weight of a reactive silicone fluid.

19. A cable insulated with the crosslinked composition of claim 18.

20. A cable insulated with the crosslinked composition of claim 18 to a thickness of 20 mils.

21. A cable according to claim 18, in which the coating composition contains 0 to 8 parts by weight of organic peroxide.

22. A cable insulated with the crosslinked composition of claim 21.

23. A cable insulated with the crosslinked composition of claim 21 to a thickness of 20 mils.

24. The cable of claim 13, in which 1 to 5 parts by weight of organic peroxide have been blended into the cable coating composition.

25. A cable according to claim 13, in which the composition of the coating includes up to 2 parts by weight of lead stearate, and up to 3 parts by weight of octamethyltetracyclosiloxane.

26. A cable as defined in claim 13 wherein the polyolefin is polyethylene.

* * * * *